United States Patent
Lewis

[19]

[11] Patent Number: 5,854,877
[45] Date of Patent: *Dec. 29, 1998

[54] ECONOMICAL WIDE RANGE SPEED CONTROL SYSTEM

[75] Inventor: Martyn A. Lewis, Pacific Palisades, Calif.

[73] Assignee: Seagate Technology, Inc., Scotts Valley, Calif.

[*] Notice: The term of this patent shall not extend beyond the expiration date of Pat. No. 5,642,461.

[21] Appl. No.: 732,069

[22] Filed: Oct. 16, 1996

Related U.S. Application Data

[63] Continuation of Ser. No. 337,803, Nov. 14, 1994, Pat. No. 5,642,461.

[51] Int. Cl.[6] ................................................. G05B 19/40
[52] U.S. Cl. .......................................... 388/812; 318/607
[58] Field of Search ................................... 318/600, 608, 318/696, 685, 807, 806; 388/812, 813, 814; 395/21

[56] References Cited

U.S. PATENT DOCUMENTS

| | | | |
|---|---|---|---|
| 4,990,838 | 2/1991 | Kawato et al. | 318/568.1 |
| 5,250,890 | 10/1993 | Tanamachi et al. | 318/811 |
| 5,297,015 | 3/1994 | Miyazaki et al. | 363/141 |
| 5,365,158 | 11/1994 | Tanaka et al. | 318/806 |
| 5,424,960 | 6/1995 | Watanabe et al. | 364/506 |

*Primary Examiner*—John W. Cabeca
*Attorney, Agent, or Firm*—Fliesler, Dubb, Meyer & Lovejoy LLP

[57] ABSTRACT

A speed control system is disclosed wherein a brushless DC motor and a magneto resistive encoder are able to rotate a motor at arbitrarily low speeds. The motor is able to rotate at low speeds by having a filtered signal generated by an encoder applied to its inputs. The encoder is coupled to a series of filters which remove DC level and harmonic distortions from the resulting encoder signal. These filtered signals are then applied to the motor to control motor rotation speed.

8 Claims, 7 Drawing Sheets

ECONOMICAL WIDE RANGE SPEED CONTROL SYSTEM

This application is a continuation of Ser. No. 08/337,803, filed Nov. 14, 1994, now U.S. Pat. No. 5,542,461.

CROSS-REFERENCE TO RELATED APPLICATIONS

The present application is related to the following U.S. Patent Applications, all filed concurrently with or prior to the present application:

1. "Arcuate Scan Read/Write Assembly", inventors Gary Nelson and Stephen J. Crompton, Ser. No. 08/337,255, filed Nov. 10, 1994.
2. "Arcuate Scan Tape Drive", inventors John M. Rothenberg, Joseph Lin, Robert H. Peirce, Richard Milo and Michaei Andrews, Ser. No. 08/113,996, filed Aug. 30, 1993, now U.S. Pat. No. 5,585,978.
3. "Method And Apparatus To Maximize The Top Speed Of Brushless DC Motors", inventor Martyn A. Lewis, Ser. No. 08/336,981, filed Nov. 10, 1994, now U.S. Pat. No. 5,589,746.
4. "System and Method For Accurate Arcuate Scan Head Positioning," inventors Martyn A. Lewis and Paul Stavish, Ser. No. 08/337,093, filed Nov. 10, 1994.

The above applications are all assigned to the assignee of the present invention and are all expressly incorporated herein by reference.

FIELD OF THE INVENTION

The present invention generally relates to a motor speed control system and, in particular, to a motor speed control system capable of precise speed control over a wide range of speeds.

BACKGROUND OF THE INVENTION

Wide range speed control systems have been developed for use in a number of disparate applications. An example of such a system is the Band-Scan FPL Control System by Sequential Electronic Systems, Inc. ("Jitterless Photorecon Systems", Electromechanical Design, December 1965). Another example can be seen in the article by Lamar Cowger, "The Solution to Extremely Slow Motion Control," Drivers & Controls Int'l., January 1982. Further, the system of BEI of Little Rock, Ark., U.S. Pat. No. 3,974,428 issued Aug. 10, 1976 to Hafle, discloses a speed control system which uses an optical encoder to generate the position signals of a motor shaft, or moveable member. The encoder is constructed and arranged to produce a phase variable output signal at the modulation frequency; the phase of the output signal being compared to a reference signal. Based on the phase and frequency of the above two signals, the speed of the drive motor for the rotary member is increased or decreased.

Both of the aforementioned systems are expensive and, in the case of the BEI system, use optical encoders whose signal outputs must be carefully shaped to produce low distortion sine and cosine waveforms. The ATAR tape recorder by the Datatape Division of Kodak also uses high quality optical encoders. By using a digital, discrete time control system, the electronics cost and size can be reduced, but an optical encoder that produces the high quality sine and cosine signals is still required.

Low cost speed control systems using inexpensive magneto-resistive (MR) encoders are used in video tape recorders. However, these systems are not able to rotate a motor at speeds of less than about 5 RPM. MR signals are inherently analog in nature and, although quasi-sinusoidal, suffer from considerable distortion, amplitude modulation and DC level drift as compared with signals generated by optical encoders. The DC level drift is of particular significance since the DC level uncertainty may range over a few tens of millivolts. However, MR encoders produce signals of a few tens of millivolts peak to peak independent of speed. This means that the peak MR signals may be substantially masked by the uncertainty in the concurrent DC level under conventional operating conditions. Furthermore, current conventional MR encoders are limited to about 1500 sine and cosine wave cycles per revolution in packages of about 1.5 inches (1.5") in diameter.

At rotational frequencies up to the encoder servo loop bandwidth encoder anomalies will generally be manifested as shaft position disturbances. Encoder anomalies at frequencies near the encoder servo natural frequency will, in fact, be harmonically exacerbated.

A particular application that requires precise motor speed control involves the storage and retrieval of data from a linear tape media. Typically a speed controlled motor is used to drive a capstan directly through a speed changing mechanism that is mechanically linked to the tape. Thus, for systems with non-longitudinal data track orientation in a write mode, non-uniform capstan motion causes two undesirable results: (a) track pitch variations; and (b) positional deviations from the desired locus of the head across the tape. In the read mode, track pitch variations reduce the available off-track margin. Track locus variations, to the degree they are not followed, also reduce off-track margins.

SUMMARY OF THE INVENTION

The present invention uses a corresponding set of signal processing techniques to allow an otherwise inadequate MR sine/cosine encoder and a relatively high torque ripple brushless motor to precisely control motor operation at arbitrarily low speeds. To eliminate the uncertainty in the DC level from different samples of MR encoders, the average DC level of the MR signals of the particular encoder sample is established during an initialization phase of operation. The remaining DC level uncertainty is known to be less than the peak value of the position dependent signal from the MR encoder; therefore, the MR signal may be DC coupled into a squaring circuit whose output can be competently relied upon to give two pulses per sine encoder cycle, and two pulses per cosine encoder cycle, from zero to very high speeds. The two pulse trains are used, in combination with a counter, to create a cyclic (1 per revolution) encoder shaft address value. Using a lookup table, a three-phase sinusoidal signal is generated from the shaft address.

An advantage of the present invention is the provision of a motor speed control system that is capable of precisely controlling the rotation of a motor at arbitrarily low speeds using an inexpensive MR encoder.

Another advantage of the present invention is the use of a corresponding set of signal processing techniques that can be optimally implemented in a small microprocessor based control system.

Still another advantage of the present invention is that the corresponding processing of the raw encoder output produces a filtered signal sufficient to allow a high torque ripple motor to be driven at arbitrarily low speeds.

A further advantage of the present invention is that the corresponding set of signal processing techniques can be effectively implemented in the digital domain and thereby, in a minimal microprocessor based control system.

Yet still another advantage of the present invention only a modest performance and thereby low cost microprocessor is required to implement the motor speed control system of the present invention.

BRIEF DESCRIPTION OF THE DRAWINGS

Additional advantages and features of the present invention will become more clearly understood from the following description of the embodiments when taken in conjunction with the accompanying drawings wherein like reference numerals denote like elements, and wherein.

DETAILED DESCRIPTION OF THE EMBODIMENTS

Figure 1:
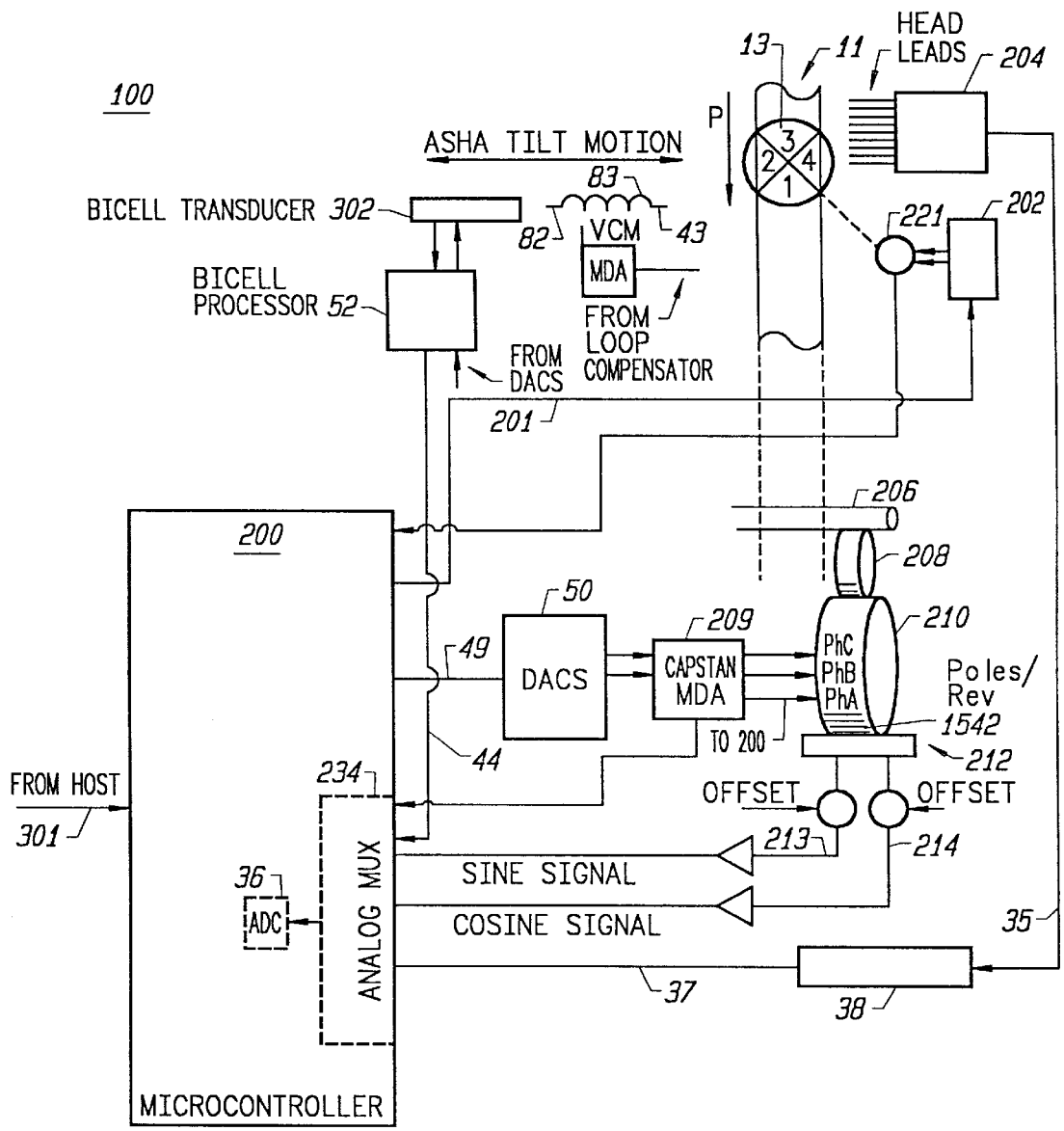
FIG. 1 is a block diagram of the tape drive system used in conjunction with the present invention.

A representative tape drive system 100 used in conjunction with the speed control system 300 of the present invention is shown in FIG. 1. The tape drive system 100 includes a microcontroller 200 that receives commands from a host (not shown) via line 301. In the preferred embodiment the microcontroller 200 is an 80C196 microcontroller manufactured by Intel. The host sends commands to the microcontroller 200 thereby causing information to be written to a tape 11 or causing information to be read from the tape 11. The microcontroller 200 is coupled to a capstan motor 210 which controls the speed at which the tape 11 propagates. A capstan motor 210 is coupled to an inexpensive MR sensor within an MR encoder 212 producing 1542 sine and cosine wave cycles per revolution on lines 213 and 214, respectively, that contain the rotational information of the motor shaft of the capstan motor 210. The output sine and cosine waveforms of the MR encoder 212 are transmitted to the microcontroller 200 where a series of digital filters within the microcontroller 200 are used to remove the noise and other distortions present within the encoder sine and cosine waveforms on lines 213 and 214 and transmit to the capstan motor 210 a highly filtered signal to efficiently commutate the windings of the capstan motor 210. An exemplary description of the encoder used in the present invention is presented in a concurrently filed U.S. patent application entitled "Arcuate Scan Read/Write Assembly", inventors Gary Nelson and Stephen J. Crompton, Ser. No. 08/337,225, filed Nov. 10, 1994, which is assigned to the assignee of the present application and is herein incorporated by reference. The capstan motor 210 used in the preferred embodiment of the present invention, is described in a currently pending U.S. patent application entitled "Arcuate Scan Tape Drive", inventors John M. Rothenburg, Joseph Lin, Robert H. Peirce, Richard Milo and Michael Andrews, Ser. No. 08/113,996, filed Aug. 30, 1993, which is also assigned to the assignee of the present invention and is incorporated herein by reference.

Figure 2:
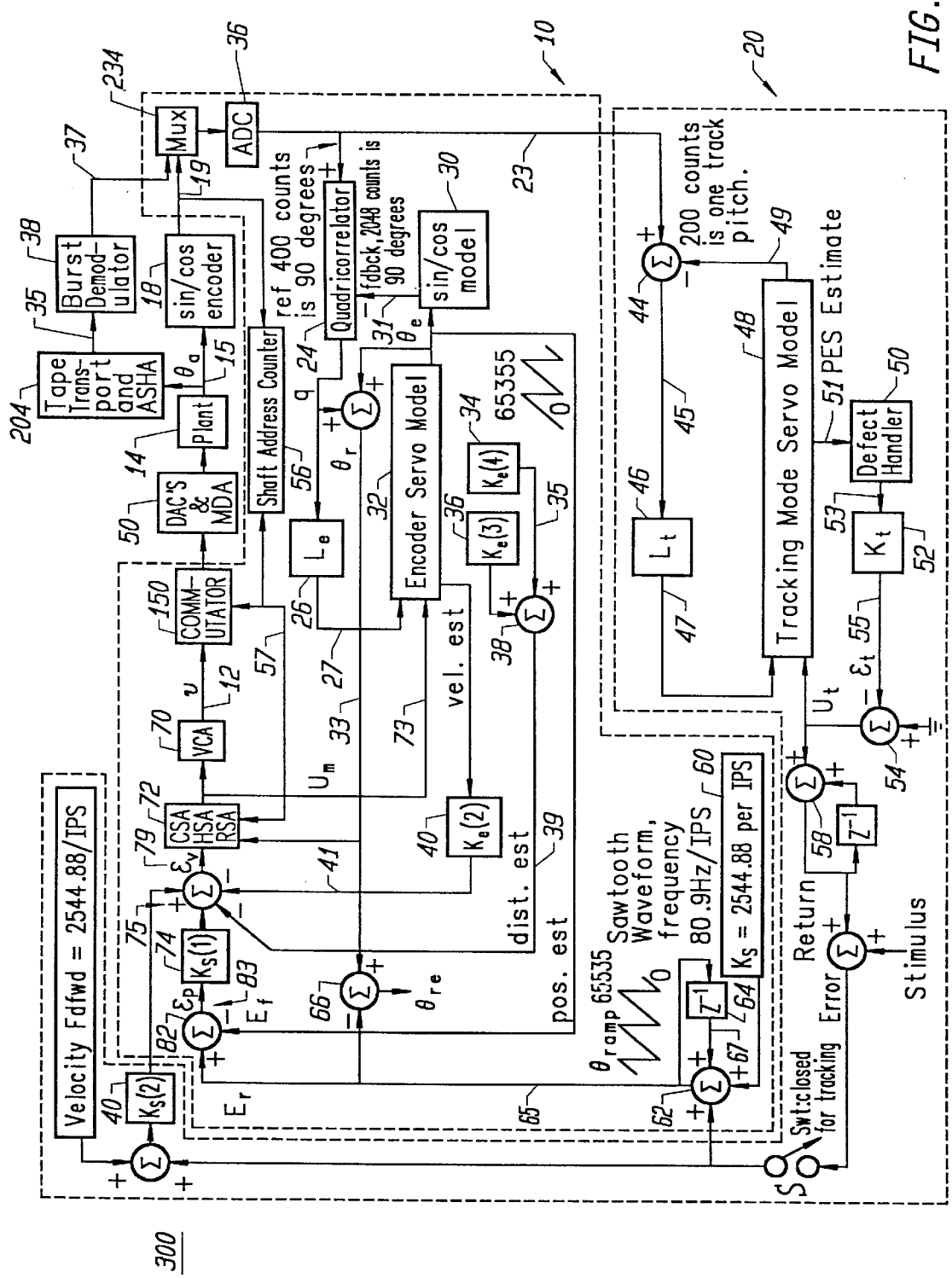
FIG. 2 is an overall block diagram of the speed control system of the present invention.

The speed control system 300 of the present invention is shown in FIG. 2. The speed control system 300 consists of an encoder servo section 10, active both when information is written to the tape 11 and when information is read from the tape 11, and a tracking servo section 20, active only when information is read from the tape 11. In the preferred embodiment of the present invention, a plant control signal U generated by the speed control system 300 is passed to a commutator block 150 whose output is passed to digital-to-analog converters (DAC's) and a Motor Drive Amplifier (MDA) 50 via line 12 to commutate a brushless DC motor (i.e. the capstan motor 210). The commutation of the capstan motor 210 of the present invention is described in detail and in a copending application that is assigned to the assignee of the present invention entitled "Method and Apparatus To Maximize The Top Speed Of Brushless DC Motors", inventor Martyn A. Lewis, Ser. No. 08/336,981, filed Nov. 10, 1994, now U.S. Pat. No. 5,589,746, and is herein incorporated by reference.

The capstan motor 210 within the plant 14 has a shaft, or other moveable member rotationally coupled to the tape capstan, whose position is $\Theta_a$. The motor shaft position $\Theta_a$ is used to provide a tracking signal on line 19 to adjust the absolute position of the transducer heads 13 of the tape drive system 100. For this purpose, the shaft position $\Theta_s$ is passed through an ASHA preamplifier 204 whose output is passed to a burst demodulator 38 via line 35. The output of the burst demodulator 38 is transmitted to a multiplexer 234 within the microcontroller 200 via line 37. The shaft position $\Theta_a$ is also used to control the relative longitudinal speed of the tape 11 past the read heads 13 of the tape drive system 100. The shaft position $\Theta_8$ is also provided to a sin/cos encoder 212 thereby producing a sin/cos representation of the actual shaft position $\Theta_a$ on line 19 (line 19 is the same as lines 213 and 214, respectively, as shown in FIG. 1). The signals present on line 19 are passed to the multiplexer 234 of the microcontroller 200 that is operative to multiplex either the sin/cos representation of the shaft position on line 19 or the output of the burst demodulator 38 on line 37 to the ADC 36 of the microcontroller 200. The signals on line 19 is also passed to a shaft address counter 56, whose output, the shaft address of $\Theta_a$, is transmitted to both the commutator block 150 and a filter box 72 via line 57.

Figure 7:
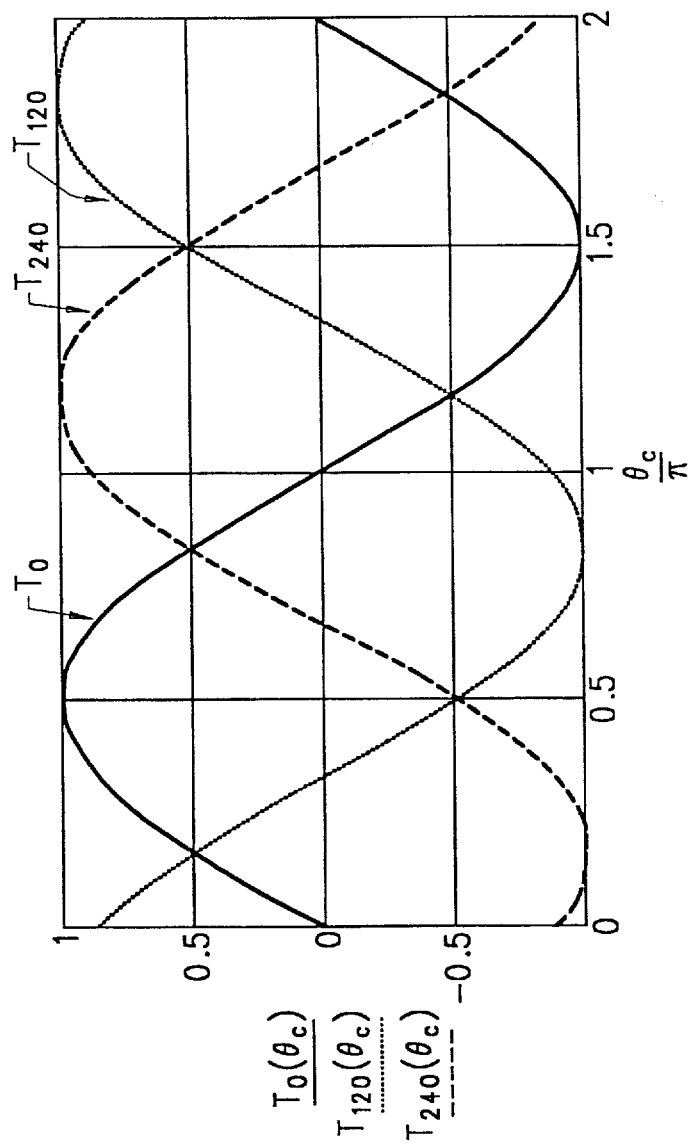
FIG. 7 illustrates the drive waveforms of the motor during the start-up routine.

The drive system of the present invention assumes that absolute shaft position is available from the encoder; however, at power on the absolute position cannot be known immediately since the encoder is an incremental device. Therefore some means of initializing the relationship between the desired sinusoidal phasing and the encoder must be provided. As previously mentioned, the motor shaft position can be defined in commutation degrees; for a 3 phase, 12 pole motor, there are 6 electrical degrees per mechanical degree. The motor shaft position which produces peak clockwise torque on application of zero current to the 0 commutation degree coil, positive full scale current to the 120 commutation degree coil, and negative full scale current to the 240 commutation degree coil is defined as 0 commutation degrees. At + of −90 commutation degrees the same coil excitation produces zero torque. At 180 commutation degrees, the same excitation produces peak counter clockwise torque. FIG. 7 depicts the motor torque as a function of commutation degree shaft angle for three conditions in all of which the coil currents are maintained independent of shaft angle: (a) positive full scale current in the 0 commutation degree coil with half scale current in the other two coils, (b) positive full scale current in the 120 commutation degree coil with negative half scale current in the other two coils, (c) positive full scale current in the 240 commutation degree coil with negative half scale current in the other two coils.

By inspection of FIG. 7, for an arbitrary shaft position, either $T_0$, $T_{120}$, or $T_{240}$ excitation will produce the greatest torque. Furthermore, there is no shaft position for which this torque is less than:

$$T_{min}'=1.5-K_{ph}\cdot I_p \quad (1)$$

Also by inspection there are two nulls associated with each of the three excitations; however, one of the nulls is potentially unstable, while the other is stable. For example, with $T_0$ excitation, the shaft position of 0 commutation degrees is unstable since, in the absence of friction, the slightest discrepancy from the ideal excitation will drive the shaft away from the null; on the other hand, if the shaft is at 180 commutation degrees, this is a stable null with $T_0$ excitation, because a disturbance away from the null will be countered by a restoring torque. Obviously, the stable nulls are associated with a negative slope of the torque characteristic. With worst case cartridge friction and other low speed losses as specified, the actual rest position for a $T_0$ excitation will be within some range of angle from 180 commutation degrees. This range is expressed in terms of the steady state current in the 0 commutation degree coil.

If commutation begins assuming that the rest position is a 180 commutation degree null, in spite of the potential error of $\Theta_r$ commutation degrees, then the effective motor torque constant may be reduced by up to a factor of $1-\cos(\Theta_r)$.

This error is not serious for low speed operation, but must be reduced for high speed operation. The power on algorithm is:

1. Apply positive full scale current (2 Amps if $G_m$ of power amplifier is 0.8 Amps/Volt) to the 0 commutation degree coil and negative half scale current to the other coils. This is termed the 180 commutation degree null, for which a stable null exists at an electrical shaft angle of 180 commutation degrees.
2. Depending on its initial position, the motor will now either remain at rest or move towards a position where motor torque is balanced by friction torque.
3. Wait about 4 seconds until the motor is at rest. When at rest, the motor is known to be at a position such that the motor torque developed (if any) is balanced by motor friction. From the calculation above, the rest position will be less than $\Theta_r$ commutation degrees from a stable null position. An algorithm which adjusts the three zero setting DAC's for the encoder sine, cosine, and index channels is used during this period of motion. Since the algorithm depends on at least some motor motion, if none takes place, a different coil sequence is energized to ensure motion.
4. Assign zero to the value of the commutation counter, accepting the potential $\Theta_r$ commutation degrees of error, and allow the system to accept motion commands with the commutation counter incremented or decremented, according to actual direction of motion, 4 counts for every encoder cycle, resetting the counter every 4*1542 counts. The phasing of the sine wave derives to the motor uses the zero count as a once around fiduciary, with count zero corresponding to 180 commutation degrees, or 30 mechanical shaft angle degrees.
5. Finally, to improve the estimate of the commutation index, the motor is rotated for a short time (while driving the data cartridge currently in place), at a speed sufficiently high for a meaningful back e.m.f. to be generated (compared with the IR drop), but low enough that the inductive reactance is small. While traveling at this speed, the phase relationship between the voltage applied to phase A of the motor and the current into phase A of the motor is measured, and the phase of the commutation is advanced or retarded until the phase relationship of motor and current is zero. At this time, the optimum motor commutation angle for slow speed operation has been learned. The operating speed for this test is derived below.

Now consider the situation where the sin/cos signals on line 19 are multiplexed into the system 100 via multiplexer 234. The sin/cos signals on line 19 are first passed through the ADC 36. The ADC output, the digital position signal on line 23, is passed through a Course Bias Compensator (CBC) filter 84 to negate the dc level drift in the signal on line 23 to ensure encoder count integrity. The output of the CBC filter 84 is passed through the DACs 50 and added to the output of the sin/cos encoder 212 at adder 74. The digitized position signals on line 23 is then passed as a first input to a quadricorrelator 24 through a Higher Harmonic Suppression/Bias Learning Algorithm (HHSIBLA) notch filter block 86. The second input to the quadricorrelator 24 is a reference signal generated by a look-up table labelled "sin/cos model" 30. The table 30 stores the model of an ideal series of values which represent shaft position in substantially the same way that the sin/cos encoder 30 represents the actual motor encoder shaft position.

The signals on line 23 are used as digital signals corresponding to every bias level crossing of the sine and cosine signals to provide shaft address incrementing (or decrementing) count having 6168 counts pre revolution. The encoder 212 is based on a three channel MR sensor which is disposed adjacent to a magnetized drum having two tracks of magnetization patterns: a position track consisting of 1542 cycles of alternating North—North and South—South transitions, and an index track consisting of a solitary pair of N—N and S—S transitions. The position track is sensed by a pair of quad-sensor groups arranged such that the two groups produce analog sinusoidal signals nominally ninety degrees apart. The index channel is read by a dual-sensor group which produces a single positive and single negative voltage per revolution. The amplitude of the signals are virtually independent of frequency over the operating speed range of the capstan motor, as required by the servo architecture. Unfortunately, the dc offset can be almost as great as the zero to peak output signal. This leads to unreliable detection of the pulses by the counter which measures shaft position, and substantial quadricorrelator 24 distortion at low speeds. (Which are a part of the DACs box 50). Three DAC's (that are part of the box labelled DACs 50) that are capable of adjusting the dc voltage into the input of the three preamplifiers used for the three MR sensor signals. At start up, during the algorithm which learns the commutation sequence of the capstan motor 210 is induced to move at least $\frac{1}{12}$th of a revolution. During this time the three DAC's are adjusted with the following procedure performed by the CBC filter 84:

First, acquire samples of the three channels by clocking the ADC 36 at a high rate, e.g. $f_{se}$ samples/sec.

Second, determine the peak to peak values of the sine and cosine channels, and the average value of the index channel. The average value of the index channel may or may not include a shaft movement encompassing one or both of the index pulses. This is only a very small contamination to the averaging process since the energy in the index pulses is small compared with the total energy during the approximate one twelfth (128 encoder cycles) of motion.

Third, from the circuit component values, the offset introduced as a function of the DAC 50 word is known. The sine and cosine channels are now offset with DAC 50 words corresponding to the mid point between their respective positive and negative peak values, while the index channel is offset by the DAC 50 word corresponding to its measured average value.

Fourth, since the offset is sufficiently large that the sine and cosine channels may be saturated during the second step above, a further one-twelfth of a revolution motion is induced by energizing the appropriate motor phases, and step 2 above is repeated, now with the signals out of saturation. This is followed by repeating step 3, above.

Fifth, the three signals from the encoder are now sufficiently well centered that during all possible future capstan activity, the integrity of the encoder pulse counter, including an index reset every revolution, is assured.

Encoder 212 anomalies whose frequencies are within or just beyond the servo bandwidth must be dealt with using very high Q (i.e. low damping ratio) notch filters in order to avoid destablizing the encoder servo section 10. The closer a notch is to the critical servo loop crossover frequency, the higher must its Q be in order to avoid introducing phase delays at the crossover frequency. By the same token, the further the notch frequency is from the servo loop crossover frequency, the lower the Q needs to be to avoid phase lags at the crossover frequency. Since the capstan speed may vary plus or minus a few percent in the read mode, resulting a corresponding change in the frequency of the encoder anomaly, fixed high Q notch filters would be ineffective since the offending disturbing frequency would move outside the range of the highly selective notch filter. Therefore, the notch filters must be adaptive. Several different types of notch filters are used.

At frequencies up to one fourth of the encoder servo loop sampling frequency, (in the preferred embodiment, one fourth of 2083 Hz, or 520.833 Hz, the best type of adaptive high Q tracking notch is one based on the Least Mean Square (LMS) algorithm, as described in Widrow & Stearns, Adaptive Signal Processing, published by Prentice-Hall, 1985. Therefore, the half carrier (189.665 Hz) and carrier frequency (379.33 Hz) distortions are dealt with using the LMS type notch.

At frequencies up to one half the sampling rate, the notch filter may be standard second order digital notch filter, sampled at the encoder sample rate, designed by standard pre-warping and bilinear transform techniques, see Franklin, Powell, and Workman, Digital Control of Dynamic Systems, Second Edition, published by Addison Wesley, 1990. The Q of such a notch can not usually made as high as the LMS based notch; however, this is not so necessary for the higher frequency distortions since they are significantly removed from the crossover frequency. The second order notch is made to track the operating speed by a single parameter control.

There are encoder distortions at even higher frequencies than half the sample rate. These anomalies are dealt with using double sampled (meaning sampled at twice the encoder servo loop sampling rate) filters operating on the digitized sine/cosine signals on line 23. These filters are designed in the same way as the single sampled filters of the previous paragraph; however, due to being double sampled, they can deal with frequencies up to the encoder servo sampling frequency. They are also made adaptive.

The higher harmonics can not be dealt with by use of an LMS algorithm since the LMS requires the generation of quadrature signals and the servo sample rate is not sufficiently high to generate these quadrature signals for frequencies higher than the encoder carrier frequency. Therefore standard second order notches each having a Q of 10 are used for the higher frequency encoder anomalies. This is accomplished using the second order notch filters found in the HHS/BLS filter box 86 on the control signal operating at the servo sample rate, and for even higher harmonics by sampling the encoder signals at twice the servo sample rate and applying two notches to each of the double sampled signals before feeding to the servo control algorithm which operates at the servo sample rate. The transfer function for a notch filter is:

$$F_{1.5}(Z) = \frac{Z^2 + \beta \cdot Z + 1}{\beta \cdot Z^2 + \beta \cdot Z + \phi} \qquad (2)$$

where β is represented by:

$$\beta_n := -\frac{8 + 2(\omega P_n)^2}{4 + (\omega P_n)^2} \qquad (3)$$

where δ is represented by:

$$\delta_n := \frac{4 + (\omega P_n)^2 + 4 \cdot \zeta \cdot \omega P_n}{4 + (\omega P_n)^2} \qquad (4)$$

where φ is represented by:

$$\phi_n := \frac{-4 \cdot \zeta P_n + 4 + (\omega P_n)}{4 + (\omega P_n)^2} \qquad (5)$$

The coefficients are a function of the rate at which the recursion is performed and the desired notch frequency and damping factor. The higher frequency notches are executed at twice the servo sample rate, the lower ones at the servo sample rate. There are a total of six second order notches; two of the notches operate on the control signal, the other two pairs on the sine and cosine signals on line 23. All the notches have a Q of 10, corresponding to a damping factor of 0.05. The table below summarizes the situation:

| Notch Location | Notch Frequency | Sampling Frequency | β at nominal speed | δ at all speeds | φ |
|---|---|---|---|---|---|
| control authority | $1 \cdot 5 \cdot f_o =$ $5.5665 \cdot 10^2$ | $f_{so} =$ $1.9157 \cdot 10^2$ | 0.28495 | 1.0494931 | 0.950507 |
| control authority | $2 \cdot f_o =$ $7.422 \cdot 10^2$ | $f_{so} =$ $1.9157 \cdot 10^3$ | −0.83118 | 1.309140 | 0.962200 |
| encoder sin & cos | $2 \cdot f_o =$ $7.422 \cdot 10^2$ | $2 \cdot f_{so} =$ $3.8314 \cdot 10^3$ | −0.83118 | 1.045478 | 0.954522 |
| encoder sin & cos | $3 \cdot f_o =$ $1.1133 \cdot 10^2$ | $2 \cdot f_{so} =$ $3.8314 \cdot 10^3$ | 0.28405 | 1.049493 | 0.950507 |

Note that δ and φ are both relatively insensitive to the notch frequency and sampling rate. Therefore, small changes in commanded speed ar accommodated by changing β in a linear manner.

The process described above, although adequate to ensure encoder count integrity, may not result in a sufficiently accurate centering of the sine and cosine channels for the purpose of avoiding contamination of the quadricorrelator output q on line 25. This is because the center values and gains of the offset DAC's 50 may not correspond to the center value and gain of the ADC 36. Therefore, an additional refinement of the determination of the bias values of the sine and cosine channels is desirable. This is performed by the Bias Learning Algorithm (BLA) 86 and is carried out at about 1 ips for one revolution.

This speed of the BLA 86 is chosen because it reduces the time taken for this algorithm to about 2.5 seconds instead of the 4.5 seconds which would be taken to rotate a revolution at the lowest system speed of 0.5734 ips. The mean value of the sine and cosine channels, over one revolution, is ascertained by taking the average of all the samples (at 480 microseconds/sample) over one revolution. The two mean values are then subtracted from all future samples of sine and cosine channels, before feeding into the quadricorrelator 24.

After the power-on adjustment described above, further slow changes in the bias are accounted for by passing the signal through a high pass filter whose cut-off frequency varies with speed. The high pass filter is implemented using a Delta transform instead of a Z transform because the Delta transform has superior numerical conditioning:

$$X(k+1) = X(k) + T_{se} \cdot \left( \frac{-2\pi \cdot f_e \cdot X(K)}{100} - U(k) \right) \quad (6)$$

$$Y(k+1) = \frac{-2\pi \cdot f_e \cdot X(K+1)}{100} + U(k+1)$$

Where input to high pass filter is U(k); output to high pass filter is Y(k); intermediate states in HPF is X(k); encoder frequency is $f_e$; and encoder servo sample interval is $t_{se}$.

The resulting high pass filter has a cut off frequency related to the encoder frequency:

$$f_{cutoff} = \frac{f_e}{100} \quad (7)$$

The output of the HHS filter 86 is passed to the quadricorrelator 24.

The quadricorrelator 24 calculates the angular difference between the filter digital signals representing actual motor shaft position transmitted from the HHS/BLA filter 86 and the theoretical or model encoder shaft position signals generated from a sin/cos model 30 via line 31. The output of the quadricorrelator q on line 25, corresponding to the difference between the actual shaft position $\Theta_s$ on line 23 and the model shaft position signal $\Theta_e$ on line 31, is transmitted to both a summing junction 28 and a three-element coefficient vector $L_e$ 26 via line 25. The output of the coefficient vector 26 is passed to an encoder servo model 32 via line 27. The encoder servo model 32 establishes a model of the speed control system 300 that, based on the applied inputs, generates a model shaft position signal $\Theta_e$ on line 90. The model shaft position signal $\Theta_e$ on line 90 addresses the look-up table 30 via line 91. The model shaft position signal $\Theta_e$ on line 91 is also passed to summing junction 28 and added to the quadricorrelator output q on line 25 thereby producing a sawtooth signal $\Theta_r$ on line 33 that is proportional to the actual shaft position $\Theta_a$ of the capstan motor 210. The sawtooth waveform $\Theta_r$ is also passed as an input to the filter box 72 via line 33.

Besides the model position signal $\Theta_e$ on line 91, the encoder servo model 32 generates three outputs based on the coefficient vector 26 inputs via line 27. First, is a velocity estimate signal (vel. est) of the system which is amplified by a scalar value in gain block $K_e(2)$ 40 and transmitted to junction 68 via line 41. Second, is a signal representing the amount of disturbance within the system transmitted on line dist. est. The disturbance signal is generated by adding the outputs of gain blocks $K_e(3)$ 36 and $K_e(4)$ 34 on lines 35 and 37, respectfully at junction 38. The inputs to the gain blocks $K_e(3)$ 36 and $K_e(4)$ 34 come from the encoder model 32 and are dependent upon the system model used. The disturbance estimate is transmitted on line dist. est. to junction 68 via line 39. The third output, an estimate of position error present on line pos. est. is the same as the model position signal $\Theta_e$ on line 91. The modeling of an electromechanical system and the generation of values that compare the position (pos. est.), velocity (vel. est.) and disturbance (dist. est.) estimates of the system from a model are application dependent.

The position error estimate signal pos.est. on line 90 (also labelled $E_p$) generated by the Encoder Model 32 is subtracted from the position reference signal $E_r$ at subtractor 82 thereby producing the phase difference between the waveforms on line 83. This phase difference denoted the position error signal $\in_p$ on line 83 is multiplied by a position feedback gain $K_e(1)$ 74. The velocity estimate vel.est. as amplified by a scaler value in gain block $K_e(2)$ 40, and the disturbance estimate of the system on dist. est. are subtracted from the amplified position error signal $\in_p$ on line 75 at junction 68, thereby producing the velocity error signal $\in_v$ on line 79. The velocity error signal $\in_v$ on line 79 is passed to the filter box 72 whose output, the model control signal $U_m$ on line 73 drives the velocity compensator algorithm (VCA) 78 whose output is the plant control signal U on line 12 used to commutate the capstan motor 210. The model control signal Um on line 23 is also transmitted as the second input to the encoder servo model 32.

The encoder servo section 10 receives as a command input a position reference signal $E_r$ on line 65 which is generated by transmitting a sawtooth ramp signal $\Theta_{ramp}$ having a frequency of 20.2248 Hz to an accumulator 64 whose output is transmitted to an adder 62 via line 67. The other inputs to adder 62 are a constant value signal source 60 coupled to the adder 62 via line 61 and the speed adjustment signal on line 71 emanating from the tracking servo section 20.

The ramp signal $\Theta_{ramp}$ is further subtracted from the sawtooth waveform signal $\Theta_r$ on line 33 at junction 66, thereby generating an error signal $\Theta_{re}$ which contains the dynamics of the motor shaft position $\Theta_a$ when the capstan motor is operating at a constant speed. Error signal $\Theta_{re}$ may also be used as a measure of the plant 14 transfer function.

The tracking servo section 20, operates to maintain head position at the track centerline of the tape 11. The tracking servo section 20 is enabled during read operations by closing a firmware switch S. The output of the burst demodulator 38 on line 37, representing the degree of misalignment of the head 13 to the track centerline of the tape 11, is transmitted to the tracking servo section 20 through ADC 36 via line 23. The signal on line 23 is coupled to a subtractor 44 along with the output of the tracking servo model 48 on line 49. The servo model 48 contains a model of the closed loop system created by the encoder section discussed above, with the encoder position feedback disabled. The output of the subtractor 44 represents the difference between the degree of misalignment and the model system value and is transmitted to tracking coefficient vector $L_t$ 46 via line 45, whose output is passed to one of the two inputs of the tracking model 48 via line 47. The second input to the tracking model 48 is the modified tracking error signal $U_t$ which will be discussed further below. The output of the tracking model 48 is an estimate of the position error of the head 13 with respect to track centerline and is labelled the PES Estimate on line 51. An exemplary discussion of positioning the head with respect to the track centerline of a tape is described in a copending application, also assigned to the assignee of the present invention entitled "System and Method for Accurate Arcuate Scan Head Positioning", inventors, Martyn A. Lewis and Paul Stavish, Serial No: 08/337,093 filed Nov. 10, 1994.

The PES Estimate is transmitted to a Defect Handler 50 via line 51. The output of the Defect Handler on line 53 is then multiplied by a gain factor $K_t$ 52 whose value represents the tracking error of the system and is represented by $\in_t$ on line 54. The Defect Handler function is known to those skilled in the art and will not be discussed further herein. The modified tracking error signal $U_r$ which is an input to the tracking model 48 is generated by adding the position error signal $\in_t$ on line 55 to ground at adder 54. The speed of the capstan motor 210 is advanced or reduced in order to maintain the heads 13 aligned with the track centerline. Adjustments in speed from the nominal speed occurring during read mode are accomplished by transmitting speed commands to the encoder section 10 through the use of the modified tracking error signal $U_r$.

The carrier frequency is the fundamental frequency component of the sin/cos signals generated by the encoder 212 on line 19 and present in the velocity error signal $\in_v$ on line 79. When the motor shaft moves at a constant speed, the carrier frequency is constant. In the preferred embodiment, the desired tape speed for propagating the tape 11 during writing and reading operation is 0.5734 ips with a corresponding motor shaft/encoder 212 speed of approximately 0.246 revolutions per second. The encoder 212 of the present invention has 1542 encoder cycles per revolution, corresponding to a carrier frequency of approximately 379.33 HZ.

Figure 3:
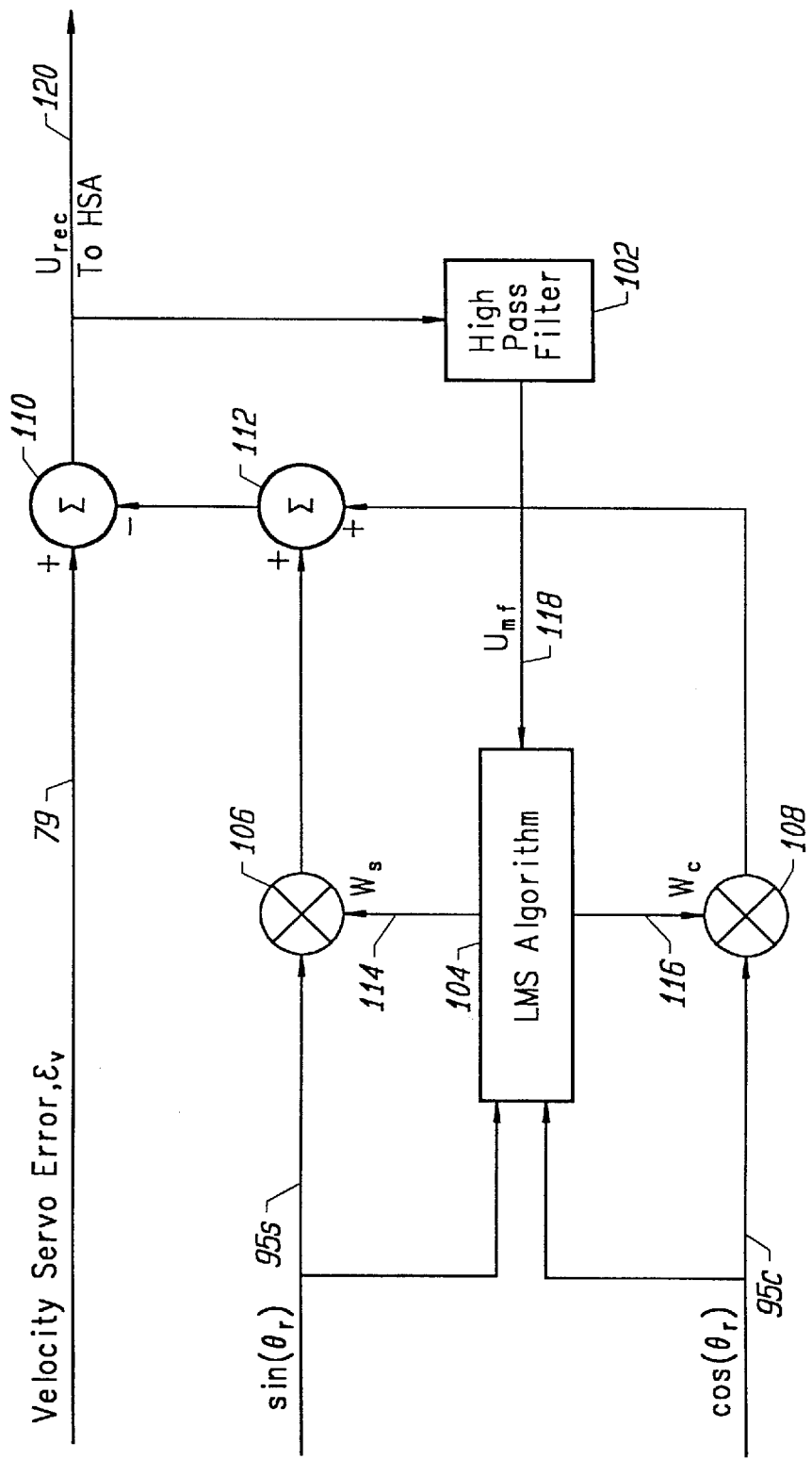
FIG. 3 is a block diagram of the carrier suppression algorithm of the present invention.

The DC level drift produced by the encoder 212 and present in the velocity error signal $\in_v$ on line 79 is negated by the Carrier Suppression Algorithm (CSA) 72a within the filter box 72 shown in FIG. 3. The velocity error signal $\in_v$ on line 79 is passed to the CSA 72a via a comparator 110. The output of the comparator 110 is passed to a high pass filter 102 that removes the DC offsets from the velocity error signal $\in_v$ on line 79 before transmitting it to a least mean squares (LMS) block 104 via line 118. The general principles of developing a LMS algorithm can be found in Franklin, Powell, and Workman, *Digital Control of Dynamic Systems*, Second Edition, published by Addison Wesley, 1990 and in Widrow and Stearns, *Adaptive Signal Processing*, published by Prentice-Hall, 1985. The equation used in the LMS block 104 is the standard LMS recursion which produces a notch filter which tracks the input sine and cosine signals from the reconstructed ramp signal $U_{rec}$ 120.

The equations executed by the LMS block 104 are:

$$W_s(k+1)=W_s(k)-\mu_c \cdot (u_{mf}(k) \cdot \sin(\Theta_r(k))) \tag{8}$$

$$W_c(k+1)=W_c(k)-\mu_c \cdot (u_{mf}(k) \cdot \cos(\Theta_r(k))) \tag{9}$$

where the sample number index is denoted k; sine signal, at index k, from the reconstructed reference ramp is $\sin(\Theta_r(k))$ on line 95s; cosine signal, at index k, from the reconstructed reference ramp is $\cos(\Theta_r(k))$ on line 95c; weighing value, at instant k, for sine signal is $w_s(k+1)$; weighing value, at instant k, for cosine signal is $w_s(k+1)$; high pass filtered version of control signal, at instant k is $u_{mf}(k)$ on line 118; and the gain of LMS loop is $\mu_c$. Also transmitted to the LMS block 104 are the sine and cosine components of $\Theta_r$ on lines 95s and 95c, respectively.

The outputs of the LMS block $W_s$ on line 114 and $W_c$ on line 116 are multiplexed to the sine $(\Theta_r)$ signal on line 95s and the cos $(\Theta_r)$ signal on line 95c, that are also inputs to the LMS block 104, at multiplexers 106 and 108, respectively. The multiplexed outputs are added together at adder 112 whose output is subtracted from the velocity error signal $\in_v$ on line 79 at comparator 110. The result of this subtraction, the reconstructed control signal, $U_{rec}$ on line 120 is transmitted to a Harmonic Suppression Algorithm (HSA) 50b.

The distortion caused by the sin/cos encoder 212 is not constant with shaft position 60, temperature, or time. The ideal algorithm would cancel all three aspects of encoder distortion. The CSA 72a uses a tracking notch filter of very high Q factor. The high Q factor ensures that a notch at the encoder frequency (which is about 23% greater than the crossover frequency) does not introduce a destabilizing lag at the crossover frequency. The filter must be a tracking filter because, the read mode capstan speed, and the associated encoder frequency may be up to 8% different from the write mode capstan speed, and associated encoder frequency, due to the tolerance on the cartridge drive ratio.

Figure 4:
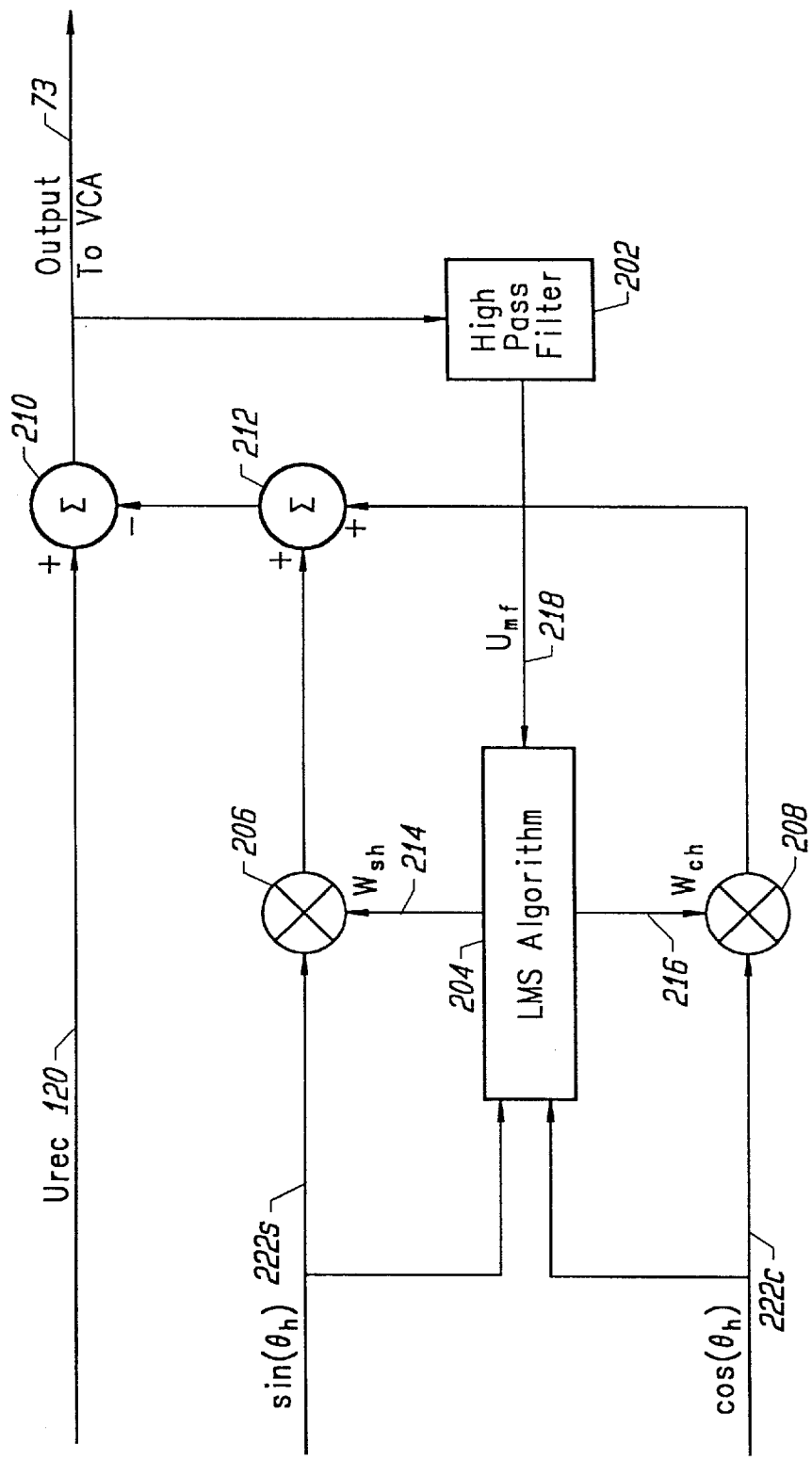
FIG. 4 is a block diagram of the harmonic suppression algorithm of the present invention.

Harmonic distortion effects are removed from the reconstructed signal $U_{rec}$ on line 120 by the Harmonic Suppression Algorithm (HSA) 72b within the filter box 72 shown in FIG. 4. The reconstructed control signal $U_{rec}$ on line 120 is transmitted to the HSA 72b via comparator 210. The output of the comparator 210 is transmitted to a high pass filter 202 which removes the harmonic distortions from reconstructed control signal $U_{rec}$ on line 120 before passing it to the LMS block 204 via line 218. The equation used in the LMS block 204 is the standard LMS recursion which produces a notch filter which tracks the input sine and cosine signals from the reconstructed control signal $U_{rec}$ on line 120.

There is one additional complication, the reference sine and cosine waveforms, on lines 222s and 222c, respectfully, must be at the appropriate harmonic or fractional harmonic. This means the ramp signals with proportionally higher slopes must be derived from the reconstructed control signal $U_{rec}$ on line 120. The algorithm to generate these ramp signals is:

The reconstructed encoder ramp signal be signal $\Theta_r$ with range [0,655355]; the harmonic ratio be a range [1.5, 2,2.5,3,4]; and the desired harmonic ramp be $\Theta_h$, where:

$$\Theta_h = \mathrm{mod}\left(\Theta_r, \frac{\Theta_r}{8 \cdot a}\right) \cdot \frac{a}{4} \quad \text{range: } [0,2047] \tag{10}$$

The equations executed by the LMS block 204 are then:

$$W_s(k+1)=W_s(k)-\mu_c \cdot (u_{mf}(k) \cdot \sin(\Theta_h(k))) \tag{11}$$

$$W_c(k+1)=W_c(k)-\mu_c \cdot (u_{mf}(k) \cdot \cos(\Theta_h(k))) \tag{12}$$

where the sample number index is k; sine signal, at index k, from reconstructed reference ramp is $\sin(\Theta_h(k))$ on line 222s; cosine signal, at index k, from reconstructed reference ramp is $\cos(\Theta_h(k))$ on line 222c; weighing value, at instant k, for sine signal is $w_s(k+1)$; weighing value, at instant k, for cosine signal is $w_c(k+1)$; high pass filtered version of control signal, at instant k is $u_{mf}(k)$ on line 218; and the gain of LMS loop is $\mu_c$. Also transmitted to the LMS block 204 are the sine and cosine components of $\Theta_h$ lines 222s and 222c, respectively.

The outputs of the LMS block $W_{sh}$ on line 214 and $W_{ch}$ on line 216 are multiplexed to $\sin(\Theta_h)$ signal on line 222s and the $\cos(\Theta_h)$ signal on line 222c, respectively which are also inputs to the LMS block 204. The multiplexed outputs on lines 215 and 216 are added together at adder 212 whose output is subtracted from the reconstructed control signal $U_{rec}$ on line 120 at comparator 210. The result of this subtraction is passed to the Viscosity Compensation Algorithm (VCA) 70 via line 73.

In addition to carrier frequency errors, errors also occur at harmonics of the carrier frequency, including fractional harmonics. These are dealt with just as the carrier frequency distortion is dealt by using a notch filter with a very high Q factor. The HSA 72b uses a tracking notch filter of very high Q factor in a servo loop. The filter must be a tracking filter because, the read mode speed, and the associated encoder frequency may be up to 8% different from the write mode capstan speed, and associated encoder frequency, due to the tolerance on the cartridge drive ratio.

Figure 5:
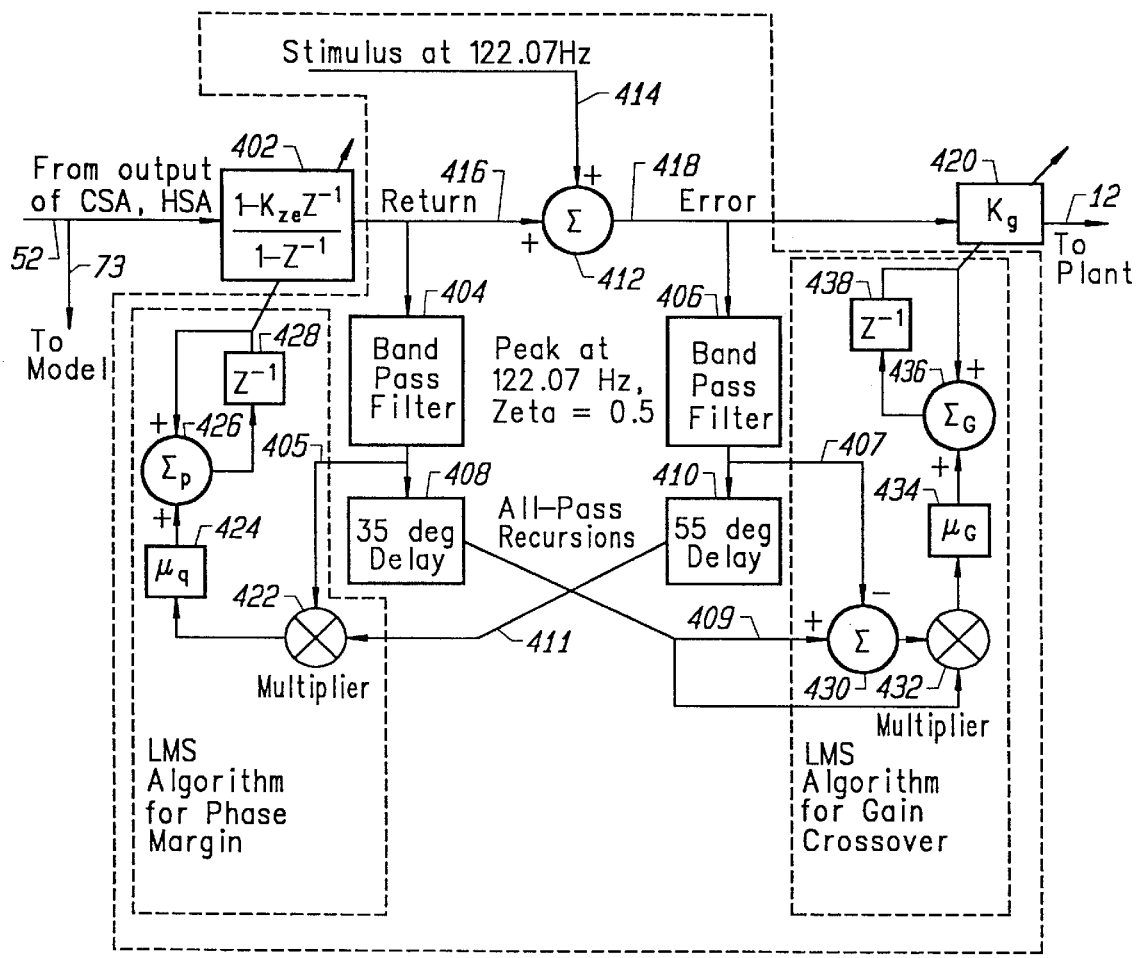
FIG. 5 is a schematic outline of the viscosity compensation algorithm of the present invention.

Viscous distortions caused by the tape cartridge (or load) are removed by the Viscosity Compensation Algorithm (VCA) 70 shown in FIG. 5. The VCA 70 ensures a loop gain crossover frequency of about 125 Hz and a phase margin of about 30 degrees. This algorithm also uses the standard LMS recursion in conjunction with a model reference adaptive structure (MRAS) that creates a reference model (to avoid confusion with the estimator model, supra.) that has the desired attributes of a reference phase delay and a gain of unity, and compares it with the actual system phase delay and gain. The difference between target phase and gain (as embodied in the system servo model 32) and the actual loop phase and gain are used to adjust the system loop phase and gain until the differences are zero, i.e. until the system phase and gain are at their target values.

The large dashed box of FIG. 5 contains all the functions temporarily added by the firmware during the operation of the VCA 70. As shown, the dashed box contains two halves: a phase margin half and a gain crossover half. The output of the HSA on line 73 is passed to the VCA 70 via transfer block 402. The phase margin target of the compensator is 35 degrees. This means that the phase of the Return signal on line 416 must lag the phase of the error signal on line 418 by 145 degrees. The phase detector used to measure the phases is a multiplier 422. A signal is passed through the multiplier 422 must be AC coupled so that no DC signal is presented to the multiplier 422 input. Two band pass filters 404 and 406, respectively, perform the aforesaid AC coupling. Band pass filters 404 and 406 are discreet time filters with a peak at the stimulus frequency of approximately 122.07 Hz. present on line 414 and a Q factor of 10. The output of the transfer block 402, the Return signal on line 416, is passed to both the band pass filter 404 and an adder 412. The output of the band pass filter 404 is passed through both the multiplier 422 and the LMS phase margin algorithm. The average output of the multiplier 422 is proportional to the amount by which the phase of its two inputs differ from 90 degrees. Therefore, in order to have the multiplier 422 deliver an average output signal of 0 when the Return signal on line 416 and the error signal on line 418 have a phase difference of 145 degrees, a delay of 55 degrees is introduced into the filtered error signal on line 407 at delay block 410 before feeding it to the multiplier 422. This phase lag means that the Return signal on line 408 will lag the delayed error signal on line 407 by 90 degrees.

The reference model for the phase margin algorithm is therefore comprised of the 55 degree phase delay on line 411 and the inherent 90 degree operation of the multiplier 422, leading to an aggregate phase delay of 145 degrees in the reference model. The multiplier 422 will have 0 average output when the desired phase margin of 35 degrees is attained. This feature allows an integrator 426 to be used as the multiplier output and the integrator output is used to drive the value of the numerator coefficient of the compensator in the appropriate direction to achieve a desired phase margin. The signal resulting from the multiplication of the delayed error signal on line 411 and the filtered return signal on line 416 is then multiplied by the LMS excursion gain 424. This value is added to the integrator 426. The output of the integrator 426, the Return signal on line 416, is added to a stimulus of 122.07 Hz at adder 412 whose output, the error signal on line 418 is then passed to both the band pass filter 406 before being processed by the VCA 70 and also to the gain block 420 whose output is passed to the commutator 150 via line 12. An exemplary description of the commutator 150 which generates the signals to drive the capstan motor 210 is present in a copending application entitled "METHOD AND APPARATUS TO MAXIMIZE THE TOP SPEED OF BRUSHLESS DC MOTORS", inventor Martyn A. Lewis, Ser. No. 08/336,981, filed Nov. 10, 1994 that is assigned to the assignee of the present invention. The VCA 70 results in the return signal phase lagging the phase of the error signal by 135 degrees.

The recursive equation for phase margin performed by the firmware as described above and represented in FIG. 5 is:

$$K_{ze}(k+1)=K_{ze}(k)-\mu_p \cdot R(k) \cdot E_d(k) \qquad (13)$$

where the index for recursion is k; next value of coefficient is $K_{ze}(k+1)$; present value of coefficient is $K_{ze}(k)$; present sample of return signal is R(k); present sample of delayed error signal is $E_d(k)$; and the gain of LMS recursion is $\mu_p$.

The gain crossover adjustment algorithm must use in-phase or out-of-phase versions of the Return signal on line 416 and the error signal on line 418. Since the phase margin adjustment algorithm described above ensures a phase of 145 degrees between the Return signal on line 416 and the error signal on line 418, an out of phase condition is achieved by delaying the Return signal on line 416 by 35 degrees, giving a net of 180 degrees. This delay is performed in block 408. The filtered error signal on line 407 is added to the now out of phase delayed Return signal on line 407 at adder 430, the result of which is then multiplied by the delayed Return error signal at multiplier 432. The multiplier 432 acts as a phase sensitive synchronous rectifier whose average output is zero (0) when the amplitudes of the filtered error signal on line 407 and the delayed Return signal on line 409 are equal. As in the phase margin adjustment discussed above, the output of the integrator 436 is used to change the gain constant of the loop. The VCA 70 due to the presence of the integrator 436, drives gain of the loop to unity at the stimulus frequency of approximately 122.07 Hz.

The recursive equation for gain crossover performed by the firmware as described above and represented in FIG. 5 is:

$$K_g(k+1)=K_g(k)-\mu_G \cdot R_d(k) \cdot (R_d(k)-E(k)) \qquad (14)$$

where the index for recursion is k; the next value of coefficient is $K_g(k+1)$; present value of coefficient is $K_g(k)$; present sample of delayed return signal is $R_d(k)$; present sample of error signal is E(k); and the gain of LMS recursion is $\mu_G$.

The gain of the plant varies by about 1.5 db as a function of shaft position $\Theta_s$ due to torque ripple. This variation is quite consistent from motor to motor and could be compensated for by changing the loop gain adjustment factor as a function of shaft position in addition to the value learned in the above algorithm. This process is carried out simultaneously with the phase margin adjustment, and both converge within about 500 milliseconds.

An alternate embodiment of the present invention would be to use the encoder model 32 as a reference model and use the quadricorrelator output q amplitude, while a 65.1 Hz stimulus is applied, as the criterion for setting the location of the zero and the loop gain. In this case, the quadricorrelator output q is synchronously rectified by multiplying it by the 65.1 Hz stimulus, and using two simultaneous LMS algorithms to drive the zero locating coefficient and the loop gain coefficient to values which result in the average output of the synchronous rectifier to zero, at which point the loop gain is unity, and the phase margin is synthesized to about 45 degrees.

Figure 6:
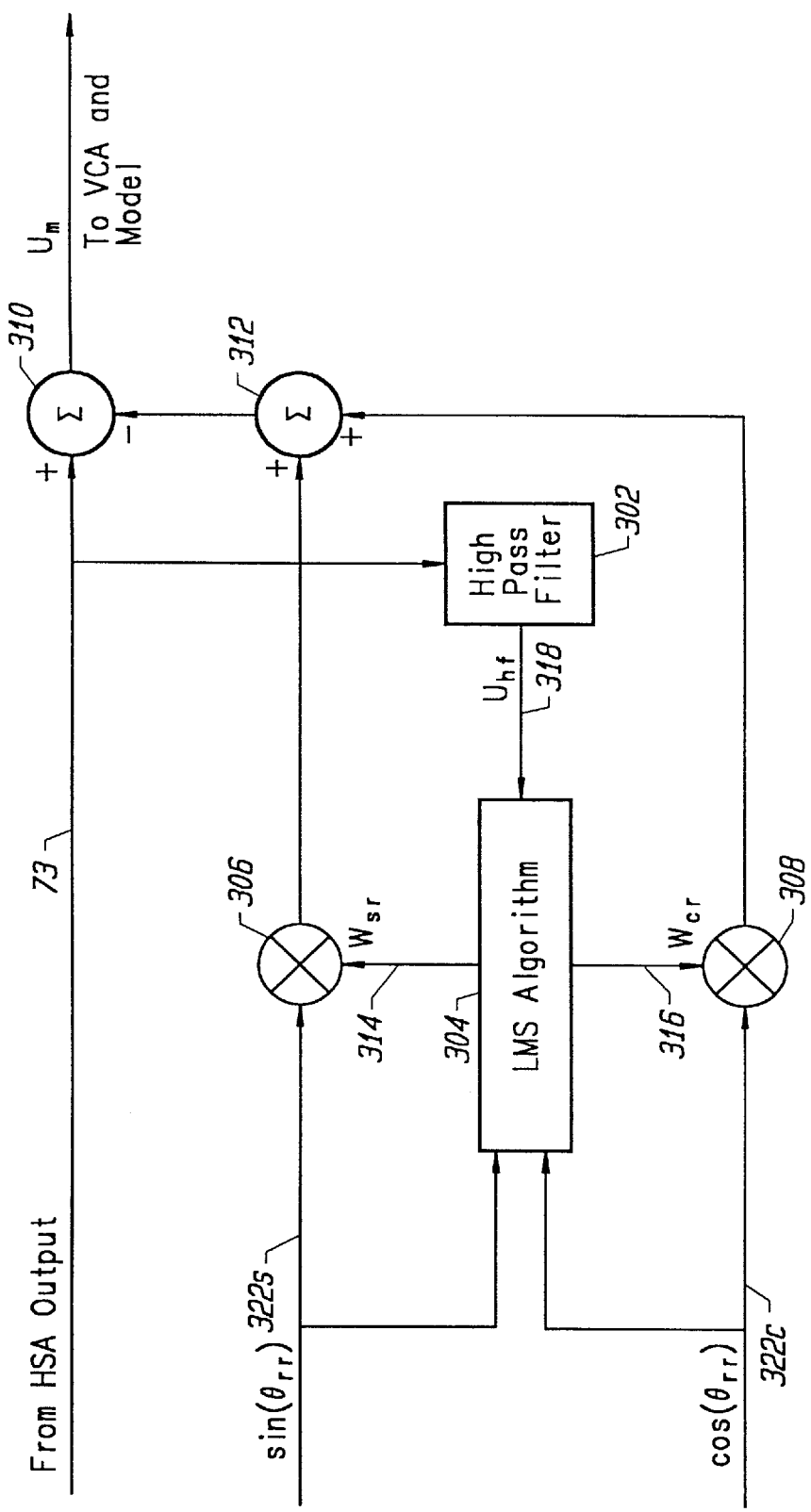
FIG. 6 is a block diagram of the ripple suppression algorithm of the present invention.

Another alternate embodiment of the present invention would be to use the same architecture as shown in FIG. 2, but couple a Ripple Suppression Algorithm (RSA) as shown in FIG. 6 between the HSA 72b within the filter box 72 and the VCA 70 for removing the torque ripple distortions at the output of the HSA 72b caused by the capstan motor 210.

The Ripple Suppression Algorithm (RSA) 72c will now be described with reference to the FIG. 6. In contrast with the CSA 72a and HSA 72b, which remove encoder anomalies by using tracking notch filters, the RSA 72c function is to compensate for motor torque ripple by use of a tracking band pass filter.

The output of the HSA is passed to the RSA 72c via high pass filter 302. This filtered signal 318 is passed to the LMS block 304. The equations executed by the LMS block 304 are:

$$W_{sr}(k+1) = w_{sr}(k) - \mu_R \cdot (u_{hf}(k) \cdot \sin(\Theta_{rr}(k))) \quad (15)$$

$$W_{cr}(K+1) = w_{cr}(k) - _R \cdot (u_{hf}(k) \cdot \cos(\Theta_{rr}(k))) \quad (16)$$

in which the sample number index is k; sine signal, at index k, from sine wave generator at 36 times/rev, is $\sin(\Theta_{rr}(k))$ on line 322s; cosine signal, at index k, from cosine generator at 36 times/rev, is $\cos(\Theta_{rr}(k))$ on line 322c; weighing value, at instant k, for sine signal is $w_{sr}(k+1)$; weighing value, at instant k, for cosine signal is $w_{cr}(k+1)$; high pass filter version of HSA output, at instant k is $U_{hr}(k)$ on line 318; and the gain of LMS loop is $\mu_R$.

As with the CSA 72a and the HSA 72b, the high pass filter 302 is used to remove DC offsets from the HSA output on line 73 before passing it to the LMS block 304. The equations executed by the LMS block 304 are the standard LMS recursion which produces a band pass filter which tracks the input sine signal on line 322s and the cosine on line 322c signals from the reconstructed signal; as such, the center frequency will track the actual instantaneous encoder frequency.

The output of the LMS block $W_{sr}$ on line 314 and the $W_{cr}$ on line 316 are multiplexed with the sine and cosine components of the reconstructed signal on lines 318s and 318c, respectively, at multiplexers 306 and 308. The result of this multiplexing is combined at adder 312. The result of this addition is subtracted from the HSA output on line 73 at comparator 310. The output of the comparator 310, is then passed to the VCA 70 and the system servo model 32.

The RSA 72c may also be viewed as a notch filter which removes ripple frequency components from the encoder signal on line 73 by applying the right amount of ripple frequency control to the capstan motor 210. This is compared with the CSA 72a and HSA 72b which remove encoder anomalies from the control signal by subtracting just the right amount of encoder anomaly signal from the encoder output. Although the algorithm, as described, removes only one ripple frequency component (at 36 times the once around frequency), additional ripple frequency components may be removed by cascading ripple suppression algorithms tuned to ripple frequency components which must be suppressed.

It should be understood that although the preferred embodiment of the present invention have been illustrated and described, various modifications thereof will become apparent to those skilled in the art. Thus, the disclosure and descriptions herein are purely illustrative and are not intended to be in any manner limiting.

What is claimed is:

1. A speed control system, comprising:

a signal source for producing a modulation frequency signal;

an encoder having a moveable member operatively connected to a device whose speed is to be controlled, said encoder coupled to said signal source, said encoder including means for converting said modulation frequency signal into a phase variable signal having a phase which is varied as a function of the position of said moveable member;

a reference frequency signal generator coupled to said modulation frequency signal source for generating a variable reference frequency signal;

a comparator operatively connected to said modulation frequency signal and said reference frequency signal for generating an error signal; and a plurality of filters in communication with said encoder, each of said plurality of filters including a notch filter operative to remove DC and frequency based distortions from said error signal, said plurality of filters providing a control signal used to control said device at low speeds.

2. The system of claim 1, further including a digital filter operative to remove viscous distortions from said error signal.

3. The system of claim 1, wherein said modulation frequency signal and said variable reference frequency signal are different.

4. The system of claim 1, wherein each of said plurality of filters is a digital filter.

5. The system of claim 1, wherein:

said filters further include either a high pass filter or a band pass filter.

6. The system of claim 5, wherein said high pass filter or said band pass filter is coupled to said notch filter.

7. A speed control system, comprising:

a modulation signal source for producing a modulation frequency signal;

a motor having a shaft, said motor being coupled to said modulation signal source;

an encoder coupled to said motor, said encoder generating a phase variable signal having a phase which is varied as a function of said motor shaft position;

a reference signal generator coupled to said modulation signal source, said reference signal generator operative to produce a variable reference frequency signal which may differ in frequency or phase from said modulation frequency signal;

a comparator coupled to said modulation signal source and said reference signal generator, said comparator generating an error signal based on any difference between said modulation signal and said reference signal; and a series of digital filters, coupled to said comparator, each respective one of said series of filters including a neural network for removing frequency distortions present in said error signal and providing a central signal operative to control said motor at low speeds.

8. The system of claim 7, wherein:

said filter includes at least one high pass filter or at least one band pass filter.

* * * * *